(12) United States Patent
Schwarzbauer et al.

(10) Patent No.: US 10,111,135 B2
(45) Date of Patent: Oct. 23, 2018

(54) OFFLOADING TRAFFIC OF A USER EQUIPMENT COMMUNICATION SESSION FROM A CELLULAR COMMUNICATION NETWORK TO A WIRELESS LOCAL AREA NETWORK (WLAN)

(71) Applicant: Nokia Solutions and Networks Oy, Espoo (FI)

(72) Inventors: Hanns Juergen Schwarzbauer, Grobenzell (DE); Simone Redana, Munich (DE); Woonhee Hwang, Espoo (FI); Jussi-Pekka Koskinen, Oulu (FI); Jarkko Tuomo Koskela, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 79 days.

(21) Appl. No.: 14/911,096

(22) PCT Filed: Aug. 9, 2013

(86) PCT No.: PCT/EP2013/066706
§ 371 (c)(1),
(2) Date: Feb. 9, 2016

(87) PCT Pub. No.: WO2015/018453
PCT Pub. Date: Feb. 12, 2015

(65) Prior Publication Data
US 2016/0198364 A1 Jul. 7, 2016

(51) Int. Cl.
*H04W 28/08* (2009.01)
*H04W 36/14* (2009.01)
(Continued)

(52) U.S. Cl.
CPC .......... *H04W 28/08* (2013.01); *H04W 36/14* (2013.01); *H04W 36/22* (2013.01); *H04W 84/12* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 8,566,455 B1* | 10/2013 | Zhao | ................... | H04W 76/025 709/227 |
| 8,665,792 B2* | 3/2014 | Perras | ................. | H04W 76/022 370/328 |

(Continued)

FOREIGN PATENT DOCUMENTS

| | | |
|---|---|---|
| WO | WO 2011/120577 A1 | 10/2011 |
| WO | WO 2012/038911 A1 | 3/2012 |

OTHER PUBLICATIONS

3GPP TS 36.331 V11.4.0 (Jun. 2013); "3rd Generation Partnership Project; Technical Specification Group Radio Access Network; Evolved Universal Terrestrial Radio Access (E-UTRA); Radio Resource Control (RRC); Protocol specification (Release 11)"; Jun. 2013; whole document (2084 pages).

(Continued)

*Primary Examiner* — Steven H Nguyen
(74) *Attorney, Agent, or Firm* — Harrington & Smith

(57) ABSTRACT

A User Equipment including at least one processor, and at least one memory for storing instructions to be executed by the processor, wherein the at least one memory and the instructions are configured to, with the at least one processor, cause the User Equipment at least: to conduct a processing for deciding whether or not it is acceptable to divert at least a part of a communication traffic of a communication currently conducted by the User Equipment with a first communication network to a second communication network, in case the decision is that it is not acceptable, to prepare a report indicating that the diversion of the communication traffic to the second communication network is (Continued)

not conducted, and to cause a transmission of the report to the first communication network.

19 Claims, 7 Drawing Sheets

(51) Int. Cl.
*H04W 36/22* (2009.01)
*H04W 88/06* (2009.01)
*H04W 84/12* (2009.01)

(56) References Cited

U.S. PATENT DOCUMENTS

| | | | | | |
|---|---|---|---|---|---|
| 8,855,045 | B2* | 10/2014 | Zhou | ............... | H04W 8/082 370/326 |
| 8,976,657 | B2* | 3/2015 | Fang | ............... | H04W 36/22 370/235 |
| 2011/0235546 | A1* | 9/2011 | Horn | ............... | H04L 12/66 370/254 |
| 2012/0230191 | A1* | 9/2012 | Fang | ............... | H04W 36/22 370/235 |
| 2012/0263145 | A1* | 10/2012 | Marinier | ............... | H04W 36/22 370/331 |
| 2013/0012204 | A1* | 1/2013 | Kim | ............... | H04W 60/06 455/435.1 |
| 2013/0028172 | A1* | 1/2013 | Lim | ............... | H04W 36/12 370/315 |
| 2013/0083783 | A1* | 4/2013 | Gupta | ............... | H04W 28/0215 370/338 |
| 2013/0322235 | A1* | 12/2013 | Khoryaev | ............... | H04W 24/10 370/229 |
| 2014/0082697 | A1* | 3/2014 | Watfa | ............... | H04W 76/025 726/3 |
| 2014/0120922 | A1* | 5/2014 | Morioka | ............... | H04W 76/025 455/446 |
| 2014/0204771 | A1* | 7/2014 | Gao | ............... | H04W 36/28 370/252 |
| 2014/0204909 | A1* | 7/2014 | Cheng | ............... | H04W 8/082 370/331 |
| 2014/0269632 | A1* | 9/2014 | Blankenship | ............... | H04W 76/025 370/336 |
| 2014/0293878 | A1* | 10/2014 | Shirakabe | ............... | H04W 48/20 370/328 |
| 2014/0302868 | A1* | 10/2014 | Miki | ............... | H04W 72/087 455/452.2 |
| 2014/0314033 | A1* | 10/2014 | Ohwatari | ............... | H04W 48/20 370/329 |
| 2014/0328182 | A1* | 11/2014 | Gao | ............... | H04W 28/08 370/236 |
| 2014/0341182 | A1* | 11/2014 | Gage | ............... | H04W 12/04 370/331 |
| 2015/0043435 | A1* | 2/2015 | Blankenship | ............... | H04L 69/322 370/329 |
| 2015/0045032 | A1* | 2/2015 | Tomici | ............... | H04W 36/04 455/436 |
| 2015/0045038 | A1* | 2/2015 | Gao | ............... | H04W 36/22 455/438 |
| 2015/0071063 | A1* | 3/2015 | Zhou | ............... | H04W 28/08 370/230 |
| 2015/0148046 | A1* | 5/2015 | Lim | ............... | H04W 36/22 455/444 |

OTHER PUBLICATIONS

3GPP TS 25.331 V11.6.0 (Jun. 2013): "3rd Generation Partnership Project; Technical Specification Group Radio Access Network; Radio Resource Control (RRC); Protocol specification (Release 11)"; Jun. 2013; whole document (346 pages).

3GPP TR 37.834 V0.3.0 (May 2013), "3$^{rd}$ Generation Partnership Project; Technical Specification Group Radio Access Network; Study on WLAN/3GPP Radio Interworking (Release 12)", 14 pgs.

* cited by examiner

OFFLOADING TRAFFIC OF A USER EQUIPMENT COMMUNICATION SESSION FROM A CELLULAR COMMUNICATION NETWORK TO A WIRELESS LOCAL AREA NETWORK (WLAN)

BACKGROUND

Field

The present invention relates to apparatuses, methods, systems, computer programs, computer program products and computer-readable media usable for a communication mechanism when traffic diversion between different communication networks is implemented.

Background Art

Prior art which is related to this technical field can e.g. be found in technical specifications according to 3GPP TS 25.331 and 3GPP TS 36.331.

The following description of background art may include insights, discoveries, understandings or disclosures, or associations, together with disclosures not known to the relevant art prior, to at least some example versions of the disclosure or of some examples of embodiments of the present invention but not provided by the invention. Some such contributions of the invention may be specifically pointed out below, whereas other such contributions of the invention will be apparent from their context.

The following meanings for the abbreviations used in this specification apply:
ANDSF: access network discovery and selection function
ANQP: access network query protocol
AP: access point
BS: base station
CPU: central processing unit
E-UTRAN: evolved UMTS radio access network
eNB: evolved node B
HS: hotspot
ID: identification, identifier
LTE: Long Term Evolution
LTE-A: LTE Advanced
NB: node B
O&M: operation and maintenance
RAN: radio access network
UE: user equipment
UMTS: universal mobile telecommunication system
WLAN: wireless local area network In the last years, an increasing extension of communication networks, e.g. of wire based communication networks, such as the Integrated Services Digital Network (ISDN), DSL, or wireless communication networks, such as the CDMA2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more intermediate network elements such as communication network control elements, such as base stations, access points control nodes, support nodes or service nodes are involved which may belong to different communication network.

Basically, a cellular communication network is typically divided into several cells controlled by a communication network control element like a BS, a NB or eNB, and the like.

Besides a classical network environment where plural cells of basically the same type (e.g. plural macro cells) are arranged in a neighboring manner, new approaches are provided in order to enhance the performance of communication networks. One of these approaches is the implementation of a heterogeneous network structure. A heterogeneous network may comprise a network using e.g. a communication cell of a first type (i.e. a macro cell) controlled by a communication network control element, such as an eNB in LTE or LTE-A networks, and one or more smaller cells using e.g. another type of communication, wherein small cells have also an own communication network control element or access network element (also referred to as an access point AP), which are referred to, for example, as local area or small cells controlled by a corresponding AP or the like. It is to be noted that the term "small cell" is typically used to describe a low-power radio access node or cell having a coverage area with a radius of tens or some hundred meters.

A heterogeneous network may use different access technologies, for example a wireless network which provides a service through WLAN based access network, a cellular based network (such as a 3GPP based network) etc., wherein it is possible to maintain services for the UE when switching a connection between the different networks.

A heterogeneous network provides, for example, an improved coverage and the possibility for diverting or offloading traffic associated to a communication relation in the macro cell to a small cell. The small cells are coupled, for example, to the communication network control element of the macro cell by a backhaul network offering high capacity, or the like.

For supporting a UE for finding a suitable network being different to the home network, i.e. to find e.g. a non-3GPP based network such as a WLAN network that can be used for data communications in addition to 3GPP access networks, there are provided several mechanisms, such as an access network discovery and selection function (ANDSF) or the like, wherein also rules policing the connection to such networks are provided.

SUMMARY

According to an example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to conduct a processing for deciding whether or not it is acceptable to divert at least a part of a communication traffic of a communication currently conducted with a first communication network to a second communication network, in case the decision is that it is not acceptable, to prepare a report (or another suitable signaling message) indicating that the diversion of the communication traffic to the second communication network is not conducted, and to cause a transmission of the report to the first communication network.

Furthermore, according to an example version of the disclosure, there is provided, for example, a method comprising conducting a processing for deciding whether or not it is acceptable to divert at least a part of a communication traffic of a communication currently conducted with a first communication network to a second communication network, in case the decision is that it is not acceptable, preparing a report (or another suitable signaling message) indicating that the diversion of the communication traffic to the second communication network is not conducted, and causing a transmission of the report (or another suitable signaling message) to the first communication network.

According to further refinements, the example versions of the disclosure may comprise one or more of the following features:

a request from the first communication network to divert at least a part of the communication traffic of a communication currently conducted with the first communication network to the second communication network may be received and processed, wherein the processing for deciding whether or not it is acceptable to divert at least a part of the communication traffic may be triggered by the request;

the processing for deciding whether or not it is acceptable to divert at least a part of the communication traffic may be based on at least one of a determination of usage conditions for the second communication network based on collected usage information, the usage conditions comprising at least one of coverage, performance, power levels, signal quality, load condition and operator identity of the second communication network, a determination of a mobility situation (e.g. actual speed of UE, UE mobility state (low, medium, high) etc.) of a communication element conducting the communication with the first communication network, a determination of a type of communication traffic (e.g. default or dedicated bearer(s), non-GBR (Guaranteed Bit Rate) bearer or GBR bearer etc.) affected by the diversion, a determination of local requirements related to a running application or communication of the communication element conducting the communication with the first communication network, a determination of user preferences (e.g. based on user interface settings, WLAN on/off etc.) related to a communication with another communication network being different to the first communication network, and a determination of a policy setting (e.g. ANDSF, HS2.0 etc) related to an access network discovery and selection function in the communication element conducting the communication with the first communication network.

the report indicating that the diversion of the communication traffic to the second communication network is not conducted may further comprise a cause code indicating a reason for the decision that the diversion is not acceptable, wherein the cause code may be derived from a result of at least one of the determinations;

a timer value to be set for postponing or stopping a transmission of a request from the first communication network to divert at least a part of the communication traffic of a communication currently conducted with the first communication network to the second communication network after transmitting the report may be determined, wherein the determining of the timer value may be conducted on the basis of one of a mobility behavior of a communication element conducting the communication with the first communication network, an availability of communication possibilities with the second communication network, an estimation of a time period required for completing a running application or communication not to be affected by a diversion of traffic to the second communication network, and user preferences or policy settings related to a communication with another communication network being different to the first communication network, wherein the report indicating that the diversion of the communication traffic to the second communication network is not conducted may further comprise an indication of the determined timer value;

at a predetermined time after the report is transmitted to the first communication network, the processing for deciding whether or not it is acceptable to divert at least a part of a communication traffic of a communication currently conducted with a first communication network to a second communication network may be repeated, wherein in case the result of the decision in the repeated processing is that it is acceptable to divert at least a part of the communication traffic to the second communication network, a changing report indicating that the diversion of the communication traffic to the second communication network is acceptable due to a change in the communication condition having led to the report that the diversion of the communication traffic to the second communication network is not conducted may be prepared, and an unsolicited transmission of the changing report to the first communication network may be caused; furthermore, according to some example versions of the disclosure, a time (after a dedicated signalling message requesting to consider steering traffic to WLAN) after the UE shall report if the WLAN is not available/acceptable may be statically specified, or a configurable timer may be considered, i.e. time should be allowed for the UE to consider whether WLAN is available or not;

the mechanism may be implemented in a communication element comprising a user equipment or terminal device capable to communicate at least with the first communication network, wherein the first communication network may be a wireless cellular communication network controlled by a communication network control element and the second communication network may be a wireless local area network controlled by a local communication network control element or access point.

In addition, according to an example version of the disclosure, there is provided, for example, an apparatus comprising at least one processor, and at least one memory for storing instructions to be executed by the processor, wherein the at least one memory and the instructions are configured to, with the at least one processor, cause the apparatus at least: to cause a transmission of a request to a communication element communicating with a first communication network to divert at least a part of the communication traffic of a communication currently conducted with the first communication network to a second communication network, to receive and process a report from the communication element indicating that a diversion of the communication traffic to the second communication network is not conducted, to set and store a status of the communication element from which the report is received to a status indicating that it is not acceptable to divert at least a part of the communication traffic of the communication currently conducted with the first communication network to the second communication network, and to postpone or stop, for a specified time period, a transmission of a further request to divert at least a part of the communication traffic of a communication currently conducted with the first communication network to the second communication network to the communication element for which the status is set.

Furthermore, according to an example version of the disclosure, there is provided, for example, a method comprising causing a transmission of a request to a communication element communicating with a first communication network to divert at least a part of the communication traffic of a communication currently conducted with the first communication network to a second communication network, receiving and processing a report from the communication element indicating that a diversion of the communication traffic to the second communication network is not conducted, setting and storing a status of the communication element from which the report is received to a status indicating that it is not acceptable to divert at least a part of the communication traffic of the communication currently conducted with the first communication network to the second communication network, and postponing or stopping, for a specified time period, a transmission of a further request to divert at least a part of the communication traffic of a communication currently conducted with the first communication network to the second communication network to the communication element for which the status is set.

According to further refinements, the example versions of the disclosure may comprise one or more of the following features:
- on the basis of the received report, a communication condition towards the second communication network may be monitored, and the result of the monitoring may be used for preparing the request to a communication element communicating with the first communication network to divert at least a part of the communication traffic of a communication currently conducted with the first communication network to the second communication network;
- a counter for each received report indicating that a diversion of the communication traffic to the second communication network is not conducted may be incremented, it may be checked whether the counter exceeds a threshold within a predetermined time, and in case the threshold is exceeded within the predetermined time, an operation and maintenance element may be informed about a possible failure of the second communication network;
- the report may comprise information indicating a reason that the diversion is not conducted, the reason being based on at least one of
  usage conditions for the second communication network based on collected usage information, the usage conditions comprising at least one of coverage, performance, and operator identity of the second communication network,
  a mobility situation of the communication element conducting the communication with the first communication network,
  a type of communication traffic affected by the diversion,
  local requirements related to a running application or communication of the communication element conducting the communication with the first communication network,
  user preferences related to a communication with another communication network being different to the first communication network, and
  a policy setting related to an access network discovery and selection function in the communication element conducting the communication with the first communication network;
- the specified time period for which a transmission of a further request to the communication element to divert at least a part of the communication traffic of a communication currently conducted with the first communication network to the second communication network is postponed or stopped may be set to a default value, wherein the default value may be preset or configurable;
- a timer information included in the received report may be received and processed, the timer information indicating a timer value to be set for postponing or stopping the transmission of the request after receiving the report, wherein the timer value is based on one of
  a mobility behavior of the communication element conducting the communication with the first communication network,
  an availability of communication possibilities with the second communication network,
  an estimation of a time period required for completing a running application or communication not to be affected by a diversion of traffic to the second communication network, and
  user preferences or policy settings related to a communication with another communication network being different to the first communication network,
  and
  the specified time period for which a transmission of a further request to the communication element to divert at least a part of the communication traffic of a communication currently conducted with the first communication network to the second communication network is postponed or stopped may be set to the timer value indicated in the timer information;
- with an unsolicited transmission after the report is received from a communication element, a changing report from the communication element whose status is set to the status indicating that it is not acceptable to divert at least a part of the communication traffic of the communication currently conducted with the first communication network to the second communication network may be received and processed, the changing report indicating that the diversion of the communication traffic to the second communication network is acceptable due to a change in the communication condition having led to the report that the diversion of the communication traffic to the second communication network is not conducted, the status of the communication element from which the changing report is received may be reset and stored, and a transmission of a further request to divert at least a part of the communication traffic of a communication currently conducted with the first communication network to the second communication network to the communication element for which the status is re-set may be allowed; the mechanism may be implemented in a communication network control element of the first communication network, wherein the communication network control element may be configured to communicate with the communication element comprising a user equipment or terminal device, wherein the first communication network may be a wireless cellular communication network and the second communication network may be a wireless local area network controlled by a local communication network control element or access point.

In addition, according to example versions of the disclosure, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some example versions of the disclosure are described below, by way of example only, with reference to the accompanying drawings, in which.

DESCRIPTION OF EXAMPLES

Figure 1:
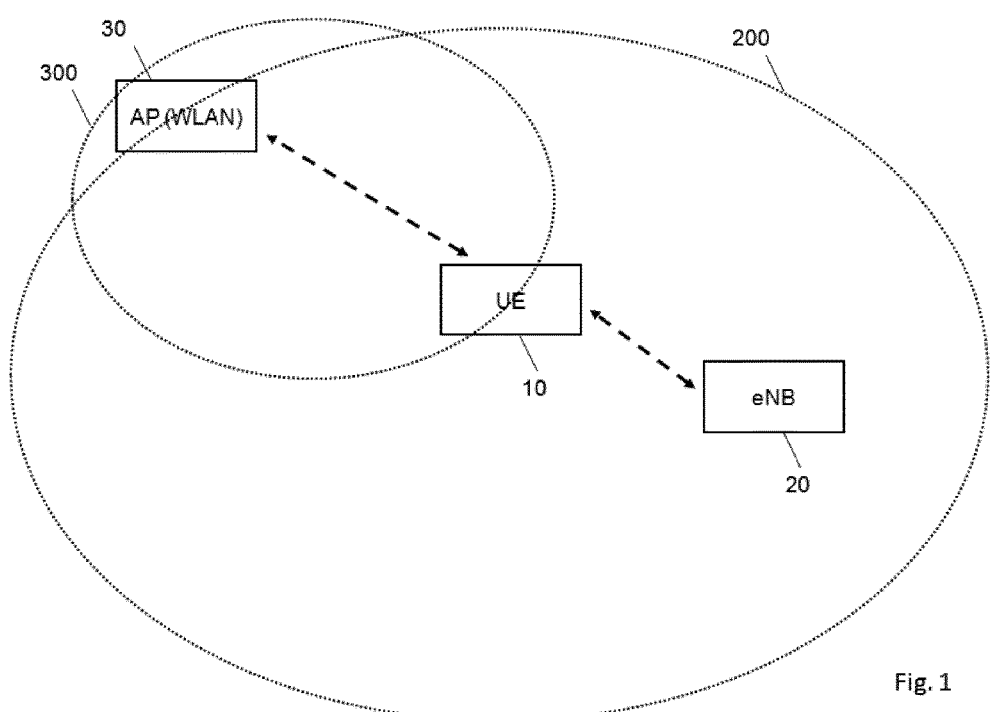
FIG. 1 shows a diagram illustrating a communication network configuration where some example versions of the disclosure are implemented.

In the following, some example versions of the disclosure are described with reference to the drawings wherein, as an example of a communication network configuration, a heterogeneous network structure comprising a first type of communication network (in the illustrated example, a cellular communication network using e.g. an LTE-Advanced based system) and a second type of communication network (in the illustrated example, a WLAN communication network) is used. However, it is to be noted that the present invention is not limited to an application using such types of communication systems, but is also applicable in other types of communication systems and the like.

The following example versions of the disclosure are only examples. Although the specification may refer to "an", "one", or "some" example versions of the disclosure in several locations, this does not necessarily mean that each such reference is to the example version of the disclosure, or that the feature only applies to a single example version of the disclosure. Single features of different example versions of the disclosure may also be combined to provide other example versions of the disclosure. Furthermore, words "comprising" and "including" should be understood as not limiting the described example versions of the disclosure to consist of only those features that have been mentioned and such example versions of the disclosure may also contain also features, structures, units, modules etc. that have not been specifically mentioned.

A basic system architecture of a communication system where example versions of the disclosure are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station, an access point, an NB or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element such as a UE and an access network element like an AP, NB or eNB besides those described in detail herein below.

The communication networks are also able to communicate with other networks, such as a public switched telephone network or the Internet. The communication network may also be able to support the usage of cloud services. It should be appreciated that APs, BSs, NBs and/or eNBs or their functionalities may be implemented by using any node, host, server or access node etc. entity suitable for such a usage.

Furthermore, the described network elements, such as terminal devices or user devices like UEs, communication network control elements of a cell, like a BS, an NB, an AP, or an eNB and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network system where some example versions of the disclosure invention are implemented is shown. It is to be noted that the configuration shown in FIG. 1 shows only those devices, network elements and/or parts which are useful for understanding principles underlying the example versions of the disclosure. As also known by those skilled in the art there may be several other network elements or devices involved in a communication network which are omitted here for the sake of simplicity.

The network configuration according to FIG. 1 is for example based on a heterogeneous network structure comprising a cellular network based on 3GPP specifications with one or more wide area cells (macro cell) and a WLAN based network with one or more neighboring cells (local area or small cells). It is to be noted that the general functions of the elements described in connection with FIG. 1 as well as of reference points/interfaces between the elements are known to those skilled in the art so that a detailed description thereof is omitted here for the sake of simplicity.

The term "neighboring cell" is to be understood in such a manner that the respective cells have at least partly overlapping coverage areas for their radio connections towards a communication element (i.e. a UE). In other words, neighboring cells are those cells which represent candidates for a handover to and from each other, wherein of course more than two cells can be neighboring cells to each other, depending on the current network architecture, communication conditions, etc.

As shown in FIG. 1, in the exemplary communication network system, a (macro) cell 200 is provided. The cell 200 is controlled by a communication network control element comprising, e.g. a (macro) eNB 20 of the first communication network.

Furthermore, as shown in FIG. 1, one or more small cells (only one is shown in FIG. 1) 300 is/are provided in a heterogeneous network structure. The small cell is controlled, for example, by a WLAN AP 30. It is to be noted that according to examples of embodiments of the invention, the small cell may be controlled by the same operator like that of the macro cell 200 (i.e. O&M systems of macro cell and small cell are able to exchange information with each other), or the small cell is part of another operator's network.

Furthermore, as indicated in FIG. 1, communication elements or devices (here UE 10) are located in the cell areas. Specifically, it is assumed that the communication network with which the UE 10 is communicating currently is that of eNB 20, but the UE 10 is basically configured to establish and conduct communication connections to both the cellular communication network (i.e. eNB 20) and the WLAN network (i.e. AP 30).

It should be appreciated that according to some example versions of the disclosure, a so-called "liquid" or flexible radio concept is employed where the operations and functionalities of a communication network control element or of another entity of the communication network, such as of one or more of the shown eNBs or APs, may be performed in different entities, such as a node, host or server, in a flexible manner. In other words, a "division of labour" between involved network elements or entities may vary case by case.

It is to be noted that even though FIG. 1 shows one macro cell 200 and one small cell 300, the number of cells is not limited thereto and can be more than two, wherein at least respective two cells are neighboring cells.

Figure 2:
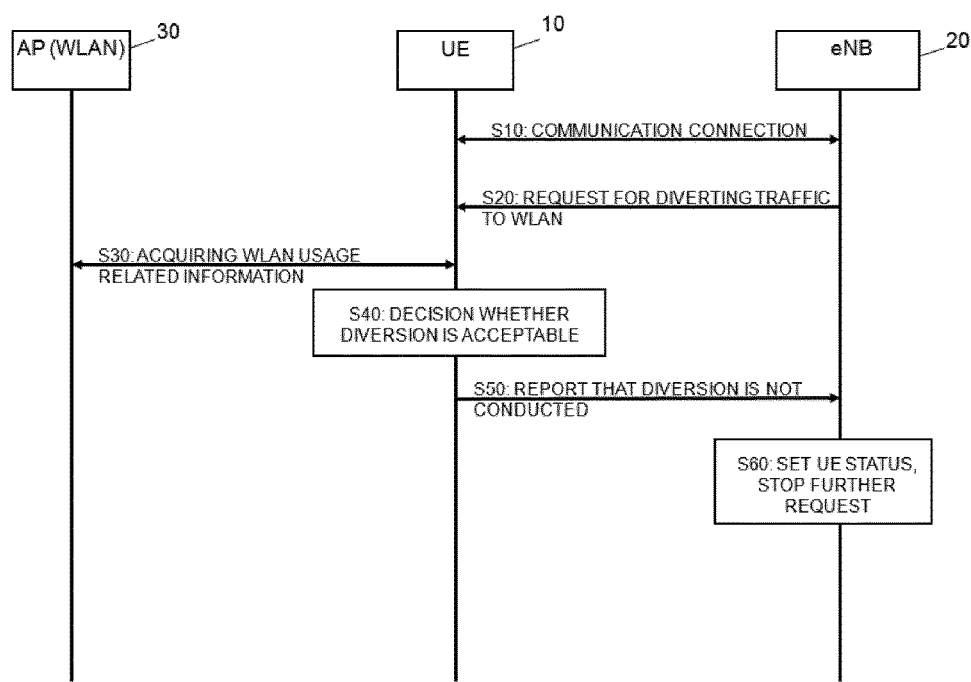
FIG. 2 shows a signaling diagram illustrating a control of a communication when a traffic diversion mechanism is implemented according to some example versions of the disclosure.

FIG. 2 shows a signaling diagram illustrating a control of a communication when a traffic diversion mechanism is implemented according to some example versions of the disclosure.

According to FIG. 2, it is assumed that a communication network (referred to as first communication network, e.g. the 3GPP based cellular communication network of cell 200) has attached a UE (UE 10) and established a communication connection (see S10). The first communication network decides (e.g. due to a load situation, a maintenance operation, an offer for a subscriber to obtain an improved service, or the like) that at least a part of a traffic in a communication conducted with UE 10 may be shifted or diverted to another communication network (referred to as second communication network, e.g. the WLAN communication network of cell or area 300). Thus, in S20, a corresponding request or indication is sent.

When the UE 10 receives in S20 the request or indication from the RAN node (eNB 20) to which it is currently attached, i.e. that it shall consider to divert traffic from the 3GPP radio interface towards the eNB 20 to a suitable WLAN radio interface, the UE 10 is configured to determine whether a WLAN network is available which can provide e.g. a comparable or even better performance than the current 3GPP radio connection to the eNB 20. For example, it is decided by the UE 10 whether diverting traffic to another network (such as a WLAN network) might be advantageous over keeping the traffic in the 3GPP network.

It is to be noted that there are plural mechanisms or methods available which can be used to inform the UE 10 in S20 that a traffic diversion is requested or proposed, i.e. that the usage of a WLAN or the like is proposed for offloading at least a part of the traffic, which are known to those skilled in the art and hence not discussed herein in further detail.

For example, in S30, the UE 10 collects or acquires information regarding usage conditions of available WLAN networks (such as network of AP 30 with cell or area 300). Suitable mechanisms for obtaining such information are based, for example, on ANQP or HS 2.0.

Then, in S40, it is decided whether or not a diversion of communication traffic from the current connection to the second communication network (the WLAN network(s) being available) is acceptable. According to some example versions of the disclosure, at least one of the following parameters is considered in the decision. For example, the UE determines whether a traffic diversion to a WLAN is acceptable on the basis of

- a determination of usage conditions for the second communication network based on collected usage information, the usage conditions comprising at least one of coverage, performance, power levels, signal quality, load condition and operator identity of the second communication network; for example, it is determined whether a WLAN coverage at the current UE location is present, how the communication performance of an available WLAN (power levels, load, throughput etc.) is at the current UE location, or which operator controls a WLAN having a coverage area at the current UE location (is the operator the same as that of the first communication network, is the operator known to be allowed or prohibited to be connected to (white list, black list etc.), and the like);
- a determination of a mobility situation of the UE (e.g. an actual speed of the UE, a UE mobility state (high, medium, low), for example based on a calculation of a moving speed or the like of the UE, for estimating that an availability time of the WLAN is not sufficiently long;
- a determination of a type of communication traffic (e.g. default bearer or dedicated bearer(s), non-GBR bearer, GBR bearer, etc.) affected by the diversion, for example the on-going traffic to be diverted (for example, a voice call may not be offloaded to the WLAN);
- a determination of local requirements related to a running application or communication of the communication element conducting the communication with the first communication network, for example, due to requirements of a specific application, currently active on the UE, which requires that no traffic is to be diverted for the time being, thus momentarily preventing traffic offloading;
- a determination of user preferences (e.g. based on user interface setting, WLAN on/off state, etc.) related to a communication with another communication network being different to the first communication network, for example a setting made by a user which allows or inhibits a usage of WLAN or the like, i.e. a WLAN usage may be blocked due to user preferences, or the UE is currently associated with another preferred WLAN network or the like, such as e.g. the subscribers enterprise, home or any other WLAN the subscriber has a special subscription with; and
- a determination of a policy setting related to an access network discovery and selection function in the communication element conducting the communication with the first communication network, such as ANDSF (or similar e.g. HS2.0 etc.) policies.

It is to be noted that the decision made in the UE in S40 may be considering plural of the above described points.

In S50, the UE 10, after having received the dedicated signalling message requesting to consider steering traffic to WLAN in S20 and having made the decision in S40, a report is sent back to the requesting RAN node (eNB 20) in case the decision is that the steering proposal (or traffic diversion request) is not adhered to.

According to some example versions of the disclosure, in case the decision in S40 is such that traffic is diverted to the WLAN, no report is sent back.

According to some example versions of the disclosure, a specific time duration is set in the RAN node (i.e. the eNB 20) for awaiting the report. That is, after the dedicated signaling message in S20 is sent, there is provided a time within which the UE shall send the report (e.g. for determining that the WLAN is not available). This specific time duration may be statically specified or derived from a configurable timer which may be set to a value estimated to be required by the UE to consider whether a WLAN is available or not.

In case the report is sent in S50, the UE 10 indicates, according to some example versions of the disclosure, also a reason why the traffic diversion is not conducted. This indication can be provided in the report by means of a suitable information, such as a cause code or the like, which reflects the processing result in S40. For example, at least one cause code or value may be included in the report which indicates that:

- no WLAN coverage, i.e. no WLAN network available at the present position of the UE;
- available WLAN performance is not sufficient (including e.g. power levels, load, throughout etc.);
- the operator of the WLAN coverage area is not allowed (e.g. not the own operator, not trusted etc.)
- the UE is in a fast moving or high mobility state;
- WLAN function is disabled by the user;
- current traffic type does nor allow WLAN usage;
- ANDSF (or similar e.g. HS2.0 etc.) policies do not allow usage of available WLAN
- any combination of the above indications.

It is to be noted that the processing in S40 and S50 can be conducted by the UE 10 before or after the UE 10 acquires terms of usage with the WLAN AP 30.

In S60, the eNB 20 as the RAN node having sent the request in S20, processes the received report. The processing includes, for example, that a status of the UE 10 having sent the request is set to a status which indicates that a traffic diversion to WLAN is at least presently not conducted. This status is used by the eNB 20, for example, to determine whether a subsequent request for traffic diversion or for proposing WLAN usage may be sent to the corresponding UE or not.

According to some example versions of the disclosure, depending for example on reasons provided in the response message, the requesting RAN node can further decide whether and for which time a consecutive offload request is to be postponed for a specified time period, or whether it has to refrain from any further requests.

For example, according to some example versions of the disclosure, the eNB 20 as the serving RAN node for the UE 10 starts a UE related timer to avoid further polling the UE for WLAN offload, i.e. to stop a further transmission of a request as in S20. For example, the duration of the timer is set to a local default value by the eNB 20.

According to other example versions of the disclosure, the timer value is set in a configurable manner by the eNB 20 on the basis of further information provided by the UE 10, e.g. in connection with the report in S50.

Specifically, according to one option, the reason indicated in the report message is also an implicit indication for the timer value to be set. For example, in case the reason for not diverting the traffic is that the WLAN function is switched off or that usage of another WLAN network is not allowed, the timer value may be set to "infinite" or "no expiry".

According to another option, the processing in S40 further comprises a determination of a suitable value for the specified time period to be used for the timer, wherein the report in S50 comprises an indication of this value. For example, the UE 10 determines a corresponding time period on the basis of a current UE speed and of locally available information regarding other WLAN APs in the UEs vicinity (e.g. for estimating a time period where better conditions are possible). Alternatively, the UE 10 determines a time period on the basis of an estimated time a currently running application needs to complete. By means of such a determination, for example, service interruptions in case of non-seamless operation of switching between WLAN and 3GPP network can be avoided.

When the specified time period expires, the RAN node (eNB 20) can start a processing for sending a further request to the UE 10, i.e. in accordance with S20, for example.

According to further example versions of the disclosure, the processing in the RAN side (i.e. the eNB 20) of the report may comprise additional aspects. For example, the eNB 20 processes the information comprised in the report, especially those regarding unfavourable WLAN connection conditions etc., to monitor the WLANs intended to be used for offloading traffic. Furthermore, the eNB 20 can use stored information about the WLAN communication situation, such as unfavorable WLAN conditions, or local policies regarding WLAN usage for the reporting UE, for determining whether a request to a UE is useful or not.

Moreover, according to some example versions of the disclosure, independently from maintaining the UE specific reports, the RAN (the eNB 20) provides one or more WLAN AP specific counters to monitor the quality of the WLAN, i.e. to monitor whether there are specific WLAN APs which provide improper or unfavorable conditions for connection of a UE. For example, the WLAN AP specific counter is incremented by one each time an UE reports unfavorable WLAN conditions for the WLAN AP to which the report is related. In case such a UE which has previously reported unfavorable WLAN AP conditions reports acceptable WLAN AP conditions in another signaling (e.g. by a changing report to be described later), the counter can be decremented by one, according to some example versions of the disclosure. Furthermore, the counter may be reset after a configurable time. In any case, if the counter expires a specific threshold within a certain time limit, the RAN node informs an O&M system that there may be a failure in a specific WLAN AP of the WLAN network, i.e. of the WLAN AP related to the counter, or the like. For example, according to some example versions of the disclosure, the WLAN AP being monitored by means of the counter and the network node (RAN node) executing the monitoring are connected to related O&M systems, e.g. in case the network operator of both the WLAN AP and the RAN node is the same.

By means of the above described example versions of the disclosure, it is possible to reduce the computational load in both the RAN node and the UE, and reduce the amount of signaling messages exchanged between the RAN node and the UE, wherein configurable timeouts between consecutive traffic offloading requests using dedicated signaling messages towards a specific UE are set.

When there is no feedback from the UE side to the serving RAN node regarding a decision that a traffic diversion from e.g. 3GPP to WLAN is not acceptable for the UE (e.g. due to conditions provided by the WLAN network the UE could connect to, preferences or the like), the RAN node is repeating the request on and on, resulting in additional processing load in both the RAN node and the UE, and unnecessary signaling traffic over the interface between the RAN node and the UE.

According to some example versions of the disclosure, in a situation where the UE 10 first starts diverting traffic to the WLAN AP 30, but discovers after some time that the user expectations can no longer be met by the WLAN (and consequently the traffic is directed back to 3GPP network), a report according to S50 is prepared and sent. Thus, it can be avoided that the 3GPP network, which would otherwise only see that the reason for suggesting the UE 10 to divert traffic is still present, sends again the request for diverting the traffic to the corresponding UE (where the unsuitable WLAN conditions may have not be changed). Hence, processing load in both the RAN node and the UE and unnecessary signaling traffic therebetween can be avoided.

It is to be noted that according to some example versions of the disclosure, a time (after a dedicated signalling message requesting to consider steering traffic to WLAN) after the UE shall report if the WLAN is not available/acceptable may be statically specified, or a configurable timer may be considered, i.e. time should be allowed for the UE to consider whether WLAN is available or not.

Furthermore, even though in the above described example versions of the disclosure a report or changing report is described to be exchanged between the UE and the RAN node, any suitable signaling message being able to convey an information corresponding to that described in connection with the report or changing report can be implemented. That is, the term "report" or "changing report" is related to any suitable signaling message transmittable between the UE and the RAN node.

Figure 3:
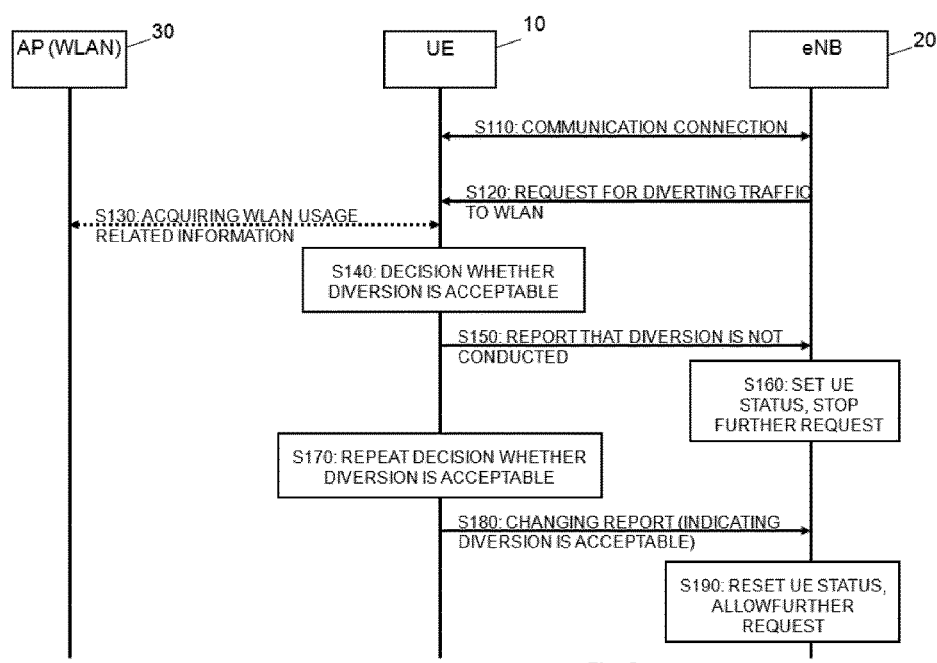
FIG. 3 shows a signaling diagram illustrating a control of a communication when a traffic diversion mechanism is implemented according to some example versions of the disclosure.

FIG. 3 shows a signaling diagram illustrating a control of a communication when a traffic diversion mechanism is implemented according to some example versions of the disclosure.

The processing in S110 to S160 is similar to that according to S10 to 60. That is, the UE 10 has decided that a traffic diversion to the WLAN AP 30 is not acceptable and informed the serving RAN node (eNB 20) accordingly. The eNB 20 in turn has set the status of the UE 10 accordingly and stopped (postponed) the transmission of further requests to the UE 10.

According to some example versions of the disclosure, as indicated in FIG. 3, the UE 10 is further configured in S170 to repeat, after a predefined time or when an event is detected triggering the repetition, the processing for deciding whether the diversion of traffic to the WLAN is acceptable or not.

For example, in case the reason for the report in S140 is based on local conditions with respect to WLAN radio conditions, or availability of WLAN, after the predefined time, it is checked by the UE 10 whether the conditions are changed such that the WLAN usage would be possible. Or in case the reason for the report in S140 is based on preferences of the user, such as a WLAN usage was prohibited, and a corresponding setting is changed, S170 is triggered by such a modification of settings. Or in case a running application having blocked the WLAN usage is terminated, S170 is triggered correspondingly.

If a decision in S170 is such that a WLAN usage would now be acceptable, i.e. that the situation causing S140 has changed, a changing report is sent in S180 to the eNB 20 for indicating that the diversion of traffic to the WLAN is now acceptable. This changing report is sent, for example, by means of an unsolicited report signaling.

It is to be noted that the decision in S170 is based on the same determinations as described in connection with S40 of FIG. 2, for example.

Otherwise, in case the decision in S170 is such that the diversion of traffic is still not acceptable (for any reason as described above), no further report is sent to the eNB 20.

When the eNB 20 receives the changing report in S180, the information therein is processed in S190. As a result, the status of the UE 10 sending the changing report is re-set from the status set in S160 (as described in connection with S60). Furthermore, the eNB 20 is enabled to send a further request towards the UE 10 to divert traffic from the 3GPP to the WLAN (i.e. as done in S120 and described in connection with S20), e.g. in case the offloading is still advertised by the eNB.

Thus, according to the example versions of the disclosure as described in connection with FIG. 3, besides the effects described in connection with FIG. 2, it is further possible to react in a flexible manner to changed conditions regarding the usage of the WLAN by the UE, so that a traffic diversion is not unnecessarily prohibited.

Figure 4:
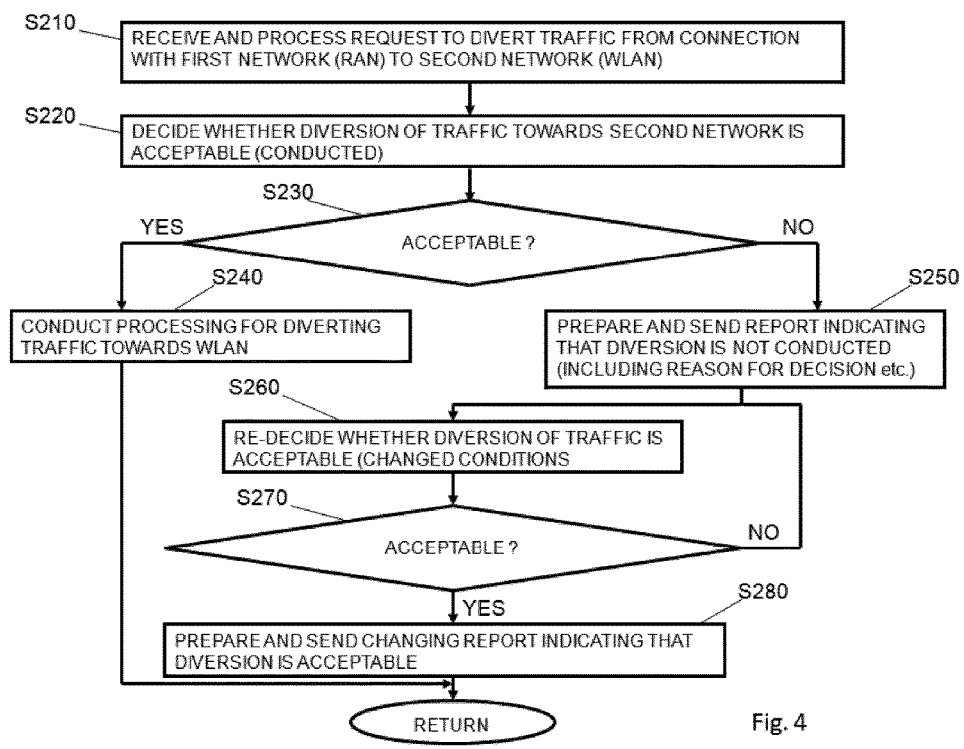
FIG. 4 shows a flow chart of a processing conducted in a communication element with regard to a control of a communication when a traffic diversion mechanism is implemented according to some example versions of the disclosure.

FIG. 4 shows a flow chart of a processing conducted in a communication element (UE 10) with regard to a control of a communication when a traffic diversion mechanism is implemented according to some example versions of the disclosure.

In S210, a request from a home network or a network to which currently a communication connection is established (first communication network) is received and processed. The request is directed to ask a communication element (the UE 10) to consider to use also a second communication network (here e.g. WLAN 300) for communication, i.e. to divert at least a part of the communication traffic of the communication currently conducted with the first communication network to the second communication network.

In S220, a processing for deciding whether or not it is acceptable to divert at least a part of a communication traffic of the communication currently conducted with the first communication network to the second communication network is acceptable. This processing may be triggered, for example, by the request received and processed in S210.

According to some example versions of the disclosure, for deciding whether the diversion of traffic is acceptable for the UE 10, at least one of the following considerations is made:
- usage conditions for the second communication network are determined, for example on the basis of collected or acquired usage information related to the second communication network (WLAN 300), wherein the usage conditions are related at least to one of coverage of the second communication network (WLAN 300), a performance of the second communication network (WLAN 300) and an ID of the operator of the second communication network (WLAN 300);
- a mobility situation of the UE 10 is determined (e.g. fast moving etc.);
- a type of communication traffic affected by the (possible) diversion is determined (e.g. whether voice calls are currently conducted which can not be diverted to the WLAN, for example, or a packet data);
    - local requirements related to a running application or communication of the UE 10 are determined (e.g. whether a currently running application has to be ended before diverting traffic, e.g. in case of downloading sensible information);
    - user preferences related to a communication with another communication network being different to the first communication network are determined (e.g. whether a user setting prohibits/allows a switching to WLAN);
- policy settings related to an access network discovery and selection function like ANDSF are determined.

In S230, the result of the decision in S220 is considered. Specifically, in case the decision is positive (i.e. a traffic diversion to WLAN 300 is acceptable), the processing proceeds to S240. Otherwise, in case the decision is negative (traffic diversion is not acceptable), the processing proceeds to S250.

In S240, i.e. in case the decision is positive, at least a part of the current data traffic exchanged with the first communication network is diverted or shifted to a communication via the second communication network (WLAN). It is to be noted that S240 comprises also a processing required for establishing proper connections and communication paths for data to be diverted and communicated via the second communication network. Furthermore, it is to be noted that in S240 a dedicated signaling towards the requesting first network may be not required.

Otherwise, in S250, in case the decision is negative (i.e. it is not acceptable to divert traffic towards the WLAN for any reason based on the decision processing), any measures related to a change of the communication connection (i.e. of a traffic diversion) is not conducted. Instead, a report indicating that the diversion of the communication traffic to the second communication network is not conducted is prepared and transmitted to the first communication network.

It is to be noted that the negative decision, i.e. that traffic diversion is not acceptable, may be made also in a case where a positive decision was made beforehand. That is, according to some example versions of the disclosure, when e.g. communication conditions have changed, resulting in an insufficient quality of service or the like provided by the second communication network, the traffic diversion may be terminated and switched back to the (original) connection to the first communication network, wherein in this case also a corresponding report is prepared and sent to the first communication network.

According to some example versions of the disclosure, the report prepared and transmitted in S250 further comprises an information such as a cause code or the like which indicates a reason for the decision that the diversion is not acceptable. That is, the information or cause code indicates which of the considerations made in the decision in S220 results in the non-acceptance of the traffic diversion (e.g. improper WLAN conditions, local requirement or setting prohibits usage of WLAN, etc.).

Furthermore, according to some example versions of the disclosure, the preparation of the report further comprises a processing being related to determine a timer value. The timer value shall indicate a configurable time period (e.g. from a short period of e.g. some seconds to an infinite duration) which is to be used in the first communication network for postponing or stopping a transmission of further request for diverting at least a part of the communication traffic of a communication currently conducted with the first communication network to the second communication network, wherein the time point of the transmission of the report may serve as a starting point. The determination of the timer value is conducted on the basis of one of a mobility behavior of the UE, an availability of communication possibilities with the second communication network (available APs or the like), an estimation of a time period required for completing a running application or communication not to be affected by a diversion of traffic to the second communication network, and user preferences or policy settings related to a communication with another communication network being different to the first communication network. The report comprises then an indication of the determined timer value.

In S260, after a predetermined time or due to an event triggering this processing (such as a user input for changing preferences, or due to an end of a running application, or the like), the processing for deciding whether or not it is acceptable to divert at least a part of a communication traffic of a communication currently conducted with a first communication network to a second communication network is repeated. For deciding whether the traffic diversion is acceptable, considerations as described in S220 can be used.

In S270, the result of the decision in S260 is considered. Specifically, in case the decision is positive (i.e. a traffic diversion to WLAN 300 is acceptable), the processing proceeds to S280. Otherwise, in case the decision is negative (traffic diversion is not acceptable), the processing returns to S260.

In S280, in case the decision is positive (i.e. it is acceptable to divert traffic towards the WLAN), a changing report indicating that the diversion of the communication traffic to the second communication network is (now) acceptable and can be conducted, is prepared and transmitted to the first communication network via an unsolicited signaling.

Then, the routine according to FIG. 4 returns.

Figure 5:
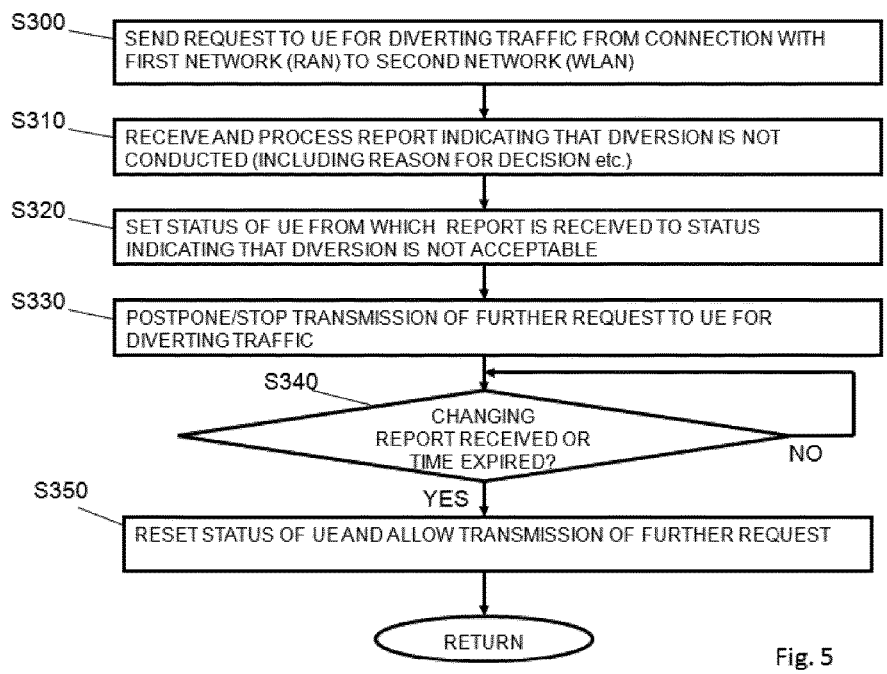
FIG. 5 shows a flow chart of a processing conducted in a communication network control element with regard to a control of a communication when a traffic diversion mechanism is implemented according to some example versions of the disclosure.

FIG. 5 shows a flow chart of a processing conducted in a communication network control element (eNB 20) with regard to a control of a communication when a traffic diversion mechanism is implemented according to some example versions of the disclosure.

In S300, a request is sent to a communication element (UE 10) which communicates with a first communication network, wherein the request is directed to ask the communication element (the UE 10) to consider to use also a second communication network (here e.g. WLAN 300) for communication, i.e. to divert at least a part of the communication traffic of the communication currently conducted with the first communication network to the second communication network.

In S310, a report from the UE is received and processed. The report indicates that a diversion of the communication traffic to the second communication network is not conducted. According to some example versions of the disclosure, the report comprises information indicating a reason that the diversion is not conducted, wherein the reason is based on at least one of:

usage conditions for the second communication network, for example coverage of the second communication network (WLAN 300), a performance of the second communication network (WLAN 300) or an ID of the operator of the second communication network (WLAN 300), which are deemed to be not suitable by the UE;

a mobility situation of the UE 10 is not suitable (e.g. fast moving etc.);

a type of communication traffic affected by the (possible) diversion is not suitable for the traffic diversion process (e.g. when voice calls are currently conducted which can not be diverted to the WLAN, for example);

local requirements related to a running application or communication of the UE 10 prohibit a diversion of traffic (e.g. when a currently running application has to be ended before diverting traffic, e.g. in case of downloading sensible information);

user preferences related to a communication with another communication network being different to the first communication network prohibit a diversion (e.g. when a user setting prohibits a switching to WLAN);

policy settings related to an access network discovery and selection function like ANDSF are not fulfilled.

In S320, a status of the UE from which the report is received in S310 is set to a status indicating that it is not acceptable to divert at least a part of the communication traffic of the communication currently conducted with the first communication network to the second communication network. This status is stored.

In S330, for a UE having a status as set in S320, for a specified time period, a transmission of any further request to divert at least a part of the communication traffic of a communication currently conducted with the first communication network to the second communication network is stopped or postponed.

According to some example versions of the disclosure, the specified time period is set to a default value stored in the communication network control element itself, wherein the default value is preset (i.e. fixed) or configurable, for example on the basis of the reason indicated in the report.

Alternatively, a timer information included in the received report is processed, wherein the timer information indicates a corresponding timer value (the specified time period) which is to be set for postponing or stopping the transmission of a further request after the report is received. For example, the timer value is set in accordance with a mobility behavior of the communication element conducting the communication with the first communication network, or an availability of communication possibilities with the second communication network, or an estimation of a time period required for completing a running application or communication not to be affected by a diversion of traffic to the second communication network, or user preferences or policy settings related to a communication with another communication network being different to the first communication network. The specified time period for which a transmission of a further request to the communication element to divert at least a part of the communication traffic of a communication currently conducted with the first communication network to the second communication network is postponed or stopped is then set according to the timer value indicated in the timer information.

It is to be noted that according to some example versions of the disclosure, e.g. in the processing in S310 or in another processing being conducted separately therefrom (not shown in FIG. 5), based on the information provided by the report received and processed in S310 indicating the reason why the traffic diversion is not acceptable, a monitoring of a communication condition towards the second communication network can be executed. A result of the monitoring may be used, for example, for preparing another request to the former requested or another communication element (UE) communicating with the first communication network to divert at least a part of the communication traffic of a communication currently conducted with the first communication network to the second communication network. In addition, the monitoring can be used to cause a maintenance operation or the like in case a failure of the second communication network can be assumed. For example, a counter is incremented for each received report indicating that a diversion of the communication traffic to the second communication network is not conducted (wherein the reason may be considered for the incrementing process, e.g. when the reason indicates insufficient communication conditions). When the counter exceeds a threshold within a predetermined time, an O&M element or the like is informed about a possible failure of the second communication network.

In S340, it is checked whether a changing report is received from the UE for which the status is set such that a transmission for a request for diverting traffic is stopped, or whether the specified time period has expired.

The changing report is received, for example, with an unsolicited transmission from the UE 10 whose status is set in S320 to the status indicating that it is not acceptable to divert at least a part of the communication traffic of the communication currently conducted with the first communication network to the second communication network. With the changing report, it is now indicated that the diversion of the communication traffic to the second communication network is acceptable due to a change in the communication condition having led to the report in S310 that the diversion of the communication traffic to the second communication network is not conducted.

If the decision in S340 is negative, the process loops back to S340.

Otherwise, in case the decision is positive (changing report is received or time period is expired), the processing proceeds to S350. In S350, the status of the UE is re-set and stored. Furthermore, a further request to divert at least a part of the communication traffic of a communication currently conducted with the first communication network to the second communication network is allowed to be sent to the UE for which the status is re-set.

Then, the routine according to FIG. 5 returns.

Figure 6:
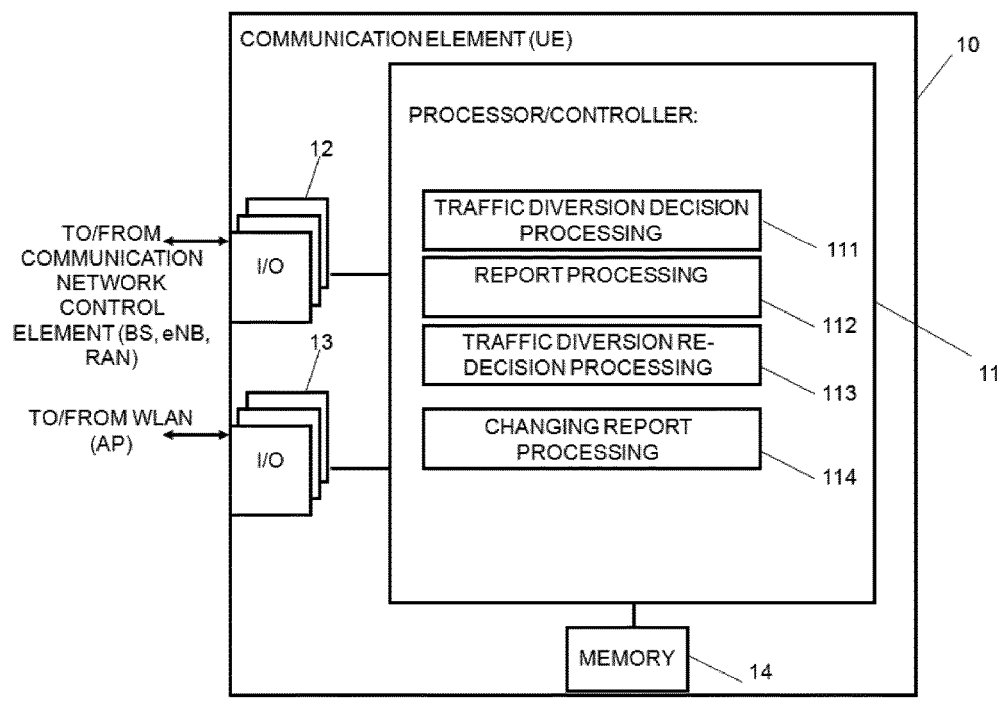
FIG. 6 shows a diagram of a communication element including processing portions conducting functions according to some example versions of the disclosure.

In FIG. 6, a diagram illustrating a configuration of a communication element, such as of the UE 10, is shown, which is configured to implement the communication procedure as described in connection with some example versions of the disclosure. It is to be noted that the communication element like the UE 10 shown in FIG. 6 may comprise several further elements or functions besides those described herein below. Furthermore, even though reference is made to a communication element like a UE, the communication element may be also another device having a similar function, such as a chipset, a chip, a module etc., which can also be part of a communication element or attached as a separate element to a communication element, or the like. It should be understood that each block and any combination thereof may be implemented by various means or their combinations, such as hardware, software, firmware, one or more processors and/or circuitry.

The communication element shown in FIG. 6 may comprise a processing function, control unit or processor 11, such as a CPU or the like, which are suitable for executing instructions given by programs or the like related to the communication procedure. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 12 and 13 denote transceiver or input/output (I/O) units (interfaces) connected to the processor 11. The I/O units 12 may be used for communicating with one or more communication network control elements of the first communication network, such as the eNB 20. The I/O units 13 may be used for communicating with one or more communication network control elements of the second communication network, such as WLAN AP 30. The I/O units 12 and 13 may be a combined unit comprising communication equipment towards several network elements, or may comprise a distributed structure with a plurality of different interfaces for different network elements. Reference sign 14 denotes a memory usable, for example, for storing data and programs to be executed by the processor 11 and/or as a working storage of the processor 11.

The processor 11 is configured to execute processing related to the above described communication procedure. In particular, the processor 11 comprises a sub-portion 111 as a processing portion which is usable for a traffic diversion decision. The portion 111 may be configured to perform processing according to S210 to S230 of FIG. 4. Furthermore, the processor 11 comprises a sub-portion 112 usable as a portion for executing a processing related to reporting. The portion 112 may be configured to perform processing according to S250 of FIG. 4. Furthermore, the processor 11 comprises a sub-portion 113 usable as a portion for a processing related to a re-decision of a traffic diversion. The portion 113 may be configured to perform a processing according to S260 and S270 of FIG. 4. Moreover, the processor 11 comprises a sub-portion 114 usable as a portion for a processing related to changing report. The portion 114 may be configured to perform a processing according to S280 of FIG. 4.

Figure 7:
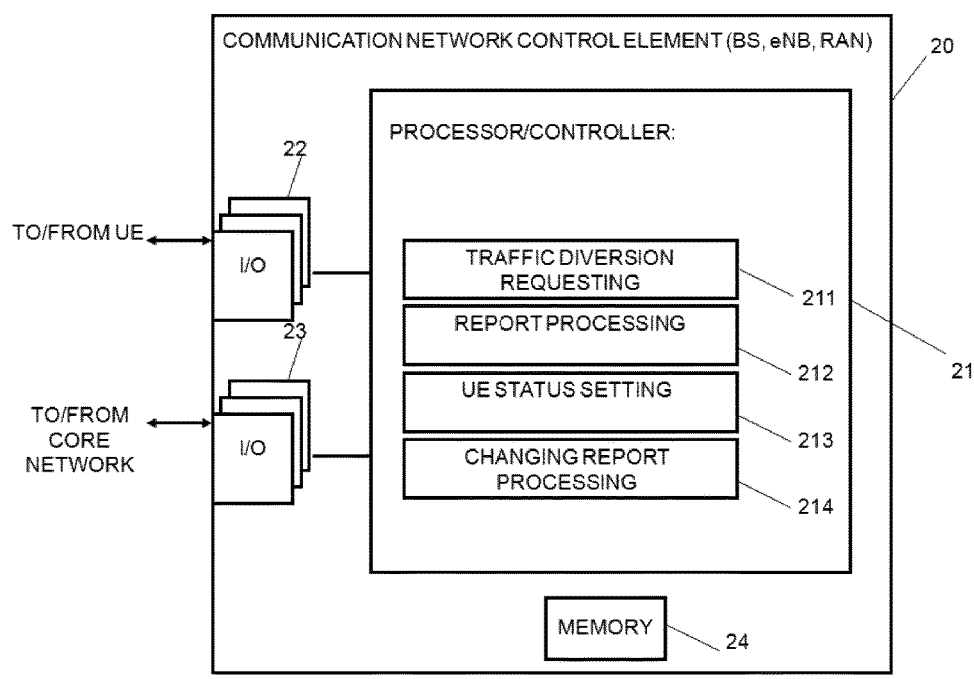
FIG. 7 shows a diagram of a communication network control element including processing portions conducting functions according to some example versions of the disclosure.

In FIG. 7, a diagram illustrating a configuration of a communication network control element, such as of the eNB 20, is shown, which is configured to implement the communication procedure as described in connection with some example versions of the disclosure. It is to be noted that the communication network control element like the eNB 20 shown in FIG. 7 may comprise several further elements or functions besides those described herein below. Furthermore, even though reference is made to a communication network control element like an eNB, the communication network control element may be also another device having a similar function, such as a chipset, a chip, a module etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 7 may comprise a processing function, control unit or processor 21, such as a CPU or the like, which are suitable for executing instructions given by programs or the like related to the communication procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more communication elements, such as UE 10. The I/O units 23 may be used for communicating with a core network. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described communication procedure. In particular, the processor 21 comprises a sub-portion 211 as a processing portion which is usable for requesting a traffic diversion. The portion 211 may be configured to perform processing according to S300 of FIG. 5. Furthermore, the processor 21 comprises a sub-portion 212 usable as a portion for processing a report from the UE. The portion 212 may be configured to perform processing according to S310 of FIG. 5. Furthermore, the processor 21 comprises a sub-portion 213 usable as a portion for setting a status of a UE. The portion 213 may be configured to perform a processing according to S320 and S350 of FIG. 5. Moreover, the processor 21 comprises a sub-portion 214 usable as a portion for a processing related to changing report. The portion 214 may be configured to perform a processing according to S340 and S350 of FIG. 5.

According to a further example version of the disclosure, there is provided an apparatus comprising processing means for conducting a processing for deciding whether or not it is acceptable to divert at least a part of a communication traffic of a communication currently conducted with a first communication network to a second communication network, preparing means for preparing, in case the decision is that it is not acceptable, a report indicating that the diversion of the communication traffic to the second communication network is not conducted, and transmission means for causing a transmission of the report to the first communication network.

According to a further example version of the disclosure, there is provided an apparatus comprising transmission means for causing a transmission of a request to a communication element communicating with a first communication network to divert at least a part of the communication traffic of a communication currently conducted with the first communication network to a second communication network, receiving and processing means for receiving and processing a report from the communication element indicating that a diversion of the communication traffic to the second communication network is not conducted, setting means for setting a status of the communication element from which the report is received to a status indicating that it is not acceptable to divert at least a part of the communication traffic of the communication currently conducted with the first communication network to the second communication network, storing means for storing the set status, and processing means for postponing or stopping, for a specified time period, a transmission of a further request to divert at least a part of the communication traffic of a communication currently conducted with the first communication network to the second communication network to the communication element for which the status is set.

It should be appreciated that

- an access technology via which data communication also including signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.
- a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. It should be appreciated that a device may be regarded as an apparatus or as an assembly of more than one apparatus, whether functionally in cooperation with each other or functionally independently of each other but in a same device housing.
- embodiments suitable to be implemented as software code or portions of it and being run using a processor are software code independent and can be specified using any known or future developed programming language, such as a high-level programming language, such as objective-C, C, C++, C#, Java, etc., or a low-level programming language, such as a machine language, or an assembler,—implementation of embodiments, is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
- embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described,
- an apparatus may be implemented by a semiconductor chip, a chipset, or a (hardware) module comprising such chip or chipset;
- embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.
- embodiments may also be implemented as computer program products, comprising a computer usable medium having a computer readable program code embodied therein, the computer readable program code adapted to execute a process as described in embodiments, wherein the computer usable medium may be a non-transitory medium. Computer program products, also called programs or computer programs, including software routines, applets and macros, may be stored in any apparatus-readable data storage medium and they comprise program instructions to perform one or more particular tasks. A computer program product may comprise one or more computer-executable components which, when the program is run, are configured to carry out embodiments. The one or more computer-executable components may be at least one software code or portions of it.

Although the present invention has been described herein before with reference to particular embodiments thereof, the present invention is not limited thereto and various modifications can be made thereto.

The invention claimed is:

1. A user equipment comprising
at least one processor, and
at least one memory for storing instructions to be executed by the processor, wherein the at least one memory and the instructions are configured to, with the at least one processor, cause the apparatus at least:
to conduct by a user equipment a processing, in response to reception of an initial request from a first communication network, for deciding whether or not it is acceptable to divert at least a part of a communication traffic of a wireless communication currently conducted by the user equipment with the first communication network using a first access technology to a second communication network using a second, different access technology,
in case the decision is that it is not acceptable, to prepare by the user equipment a report indicating that the diversion of the communication traffic by the user equipment from the first communication to the second communication network is not conducted,
to determine, by the user equipment and based on one or more conditions at the user equipment, a timer value to be set by the first communication network for postponing or stopping a transmission of one or more additional requests, subsequent to the initial request, from the first communication network to the user equipment to divert at least a part of the communication traffic of the communication, and
to cause a transmission by the user equipment of the report, comprising the timer value, to the first communication network.

2. The user equipment according to claim 1, wherein the at least one memory and the instructions are further configured to, with the at least one processor, cause the apparatus at least
to receive and process by the user equipment a request from the first communication network to divert at least a part of the communication traffic of a communication currently conducted with the first communication network to the second communication network,
wherein the processing for deciding whether or not it is acceptable to divert at least a part of the communication traffic is triggered by the request.

3. The user equipment according to claim 1, wherein the processing for deciding whether or not it is acceptable to divert at least the part of the communication traffic is based on at least one of
a determination of usage conditions for the second communication network based on collected usage information, the usage conditions comprising at least one of coverage, performance, and operator identity of the second communication network,
a determination of a mobility situation of the user equipment conducting the communication with the first communication network,
a determination of a type of communication traffic affected by the diversion,
a determination of local requirements related to a running application or communication of the user equipment conducting the communication with the first communication network,
a determination of user preferences related to a communication with another communication network being different to the first communication network, and
a determination of a policy setting related to an access network discovery and selection function in the user equipment conducting the communication with the first communication network.

4. The user equipment according to claim 3, wherein the report indicating that the diversion of the communication traffic to the second communication network is not conducted further comprises a cause code indicating a reason for the decision that the diversion is not acceptable, wherein the cause code is derived from a result of at least one of the determinations.

5. The user equipment according to claim 2, wherein the determining of the timer value is conducted on the basis of one of
a mobility behavior of the user equipment conducting the communication with the first communication network,
an availability of communication possibilities with the second communication network,
an estimation of a time period required for completing a running application or communication not to be affected by a diversion of traffic to the second communication network, and
user preferences or policy settings related to a communication with the second communication network being different to the first communication network.

6. The user equipment according to claim 1, wherein the at least one memory and the instructions are further configured to, with the at least one processor, cause the apparatus at least
to repeat, at a predetermined time after the report by the user equipment is transmitted to the first communication network, the processing by the user equipment for deciding whether or not it is acceptable to divert at least a part of a communication traffic of a communication currently conducted by the user equipment with a first communication network to a second communication network,
in case the result of the decision in the repeated processing is that it is acceptable to divert at least a part of the communication traffic to the second communication network, to prepare by the user equipment a changing report indicating that the diversion of the communication traffic by the user equipment to the second communication network is acceptable due to a change in the communication condition having led to the report that the diversion of the communication traffic by the user equipment to the second communication network is not conducted, and
to cause an unsolicited transmission by the user equipment of the changing report to the first communication network.

7. The user equipment according to claim 1, wherein the user equipment comprises a user equipment or terminal device capable to communicate at least with the first communication network, wherein the first communication network is a wireless cellular communication network controlled by a base station and the second communication network is a wireless local area network controlled by a local base station or access point.

8. A method comprising
conducting by a user equipment a processing, in response to reception of an initial request from a first communication network, for deciding whether or not it is acceptable to divert at least a part of a communication traffic of a wireless communication currently conducted by the user equipment with the first communication network using a first access technology to a second communication network using a second, different access technology,
in case the decision is that it is not acceptable, preparing by the user equipment a report indicating that the diversion of the communication traffic by the user equipment from the first communication to the second communication network is not conducted,
to determine, by the user equipment and based on one or more conditions at the user equipment, a timer value to be set by the first communication network for postponing or stopping a transmission of one or more additional requests, subsequent to the initial request, from the first communication network to the user equipment to divert at least a part of the communication traffic of the communication, and
causing a transmission by the user equipment of the report, comprising the timer value, to the first communication network.

9. A base station comprising
at least one processor, and at least one memory for storing instructions to be executed by the processor, wherein the at least one memory and the instructions are configured to, with the at least one processor, cause the apparatus at least:
to cause by the base station in a first communication network using a first access technology a transmission of an initial request to a user equipment communicating with the first communication network to divert at least a part of the communication traffic of a wireless communication currently conducted by the user equipment with the first communication network to a second communication network using a second, different access technology,
to receive and process by the base station a report from the user equipment indicating that a diversion of the communication traffic by the user equipment to the second communication network is not conducted, the report comprising a timer value to be set by the first communication network for postponing or stopping a transmission of one or more additional requests, subsequent to the initial request, from the first communication network to the user equipment to divert at least a part of the communication traffic of the communication,
to set and store by the base station a status of the user equipment from which the report is received to a status indicating that it is not acceptable to divert at least a part of the communication traffic of the communication currently conducted by the user equipment with the first communication network to the second communication network, and
to postpone or stop, for at least a specified time period determined using the timer value, by the base station a transmission by the first communication network to the user equipment for which the status is set of a further request to divert at least a part of the communication traffic of a communication currently conducted by the user equipment with the first communication network to the second communication network.

10. The base station according to claim 9, wherein the at least one memory and the instructions are further configured to, with the at least one processor, cause the apparatus at least
to monitor, on the basis of the received report, a communication condition towards the second communication network, and
to use the result of the monitoring for preparing the request to the user equipment communicating with the first communication network to divert at least a part of the communication traffic of a communication currently conducted by the user equipment with the first communication network to the second communication network.

11. The base station according to claim 9, wherein the at least one memory and the instructions are further configured to, with the at least one processor, cause the apparatus at least
to increment a counter for each received report indicating that a diversion of the communication traffic to the second communication network is not conducted,
to check whether the counter exceeds a threshold within a predetermined time, and
in case the threshold is exceeded within the predetermined time, to inform an operation and maintenance element about a possible failure of the second communication network.

12. The base station according to claim 9, wherein the report comprises information indicating a reason that the diversion is not conducted, the reason being based on at least one of
usage conditions for the second communication network based on collected usage information, the usage conditions comprising at least one of coverage, performance, and operator identity of the second communication network,
a mobility situation of the user equipment conducting the communication with the first communication network,
a type of communication traffic affected by the diversion,
local requirements related to a running application or communication of the user equipment conducting the communication with the first communication network,
user preferences related to a communication with another communication network being different to the first communication network, and
a policy setting related to an access network discovery and selection function in the user equipment conducting the communication with the first communication network.

13. The base station according to claim 9, wherein the at least one memory and the instructions are further configured to, with the at least one processor, cause the apparatus at least
to set by the base station the specified time period for which a transmission of a further request to the user equipment to divert at least a part of the communication traffic of a communication currently conducted by the user equipment with the first communication network to the second communication network is postponed or stopped to a default value, wherein the default value is preset or configurable.

14. The base station according to claim 9, wherein the at least one memory and the instructions are further configured to, with the at least one processor, cause the apparatus at least to receive and process by the base station, with an unsolicited transmission after the report is received from a user equipment, a changing report from the user equipment whose status is set, the changing report indicating that the diversion of the communication traffic to the second communication network is acceptable, to re-set and store by the base station the status of the user equipment from which the changing report is received, and to cause by the base station a transmission by the first communication network of a further request to divert at least a part of the communication traffic of a communication currently conducted with the first communication network to the second communication network to the user equipment for which the status is re-set.

15. The base station according to claim 9, wherein the base station is of the first communication network, wherein the base station is configured to communicate with the user equipment comprising a user equipment or terminal device, wherein the first communication network is a wireless cellular communication network and the second communication network is a wireless local area network controlled by a local base station or access point.

16. The base station according to claim 9, further comprising, in response to expiration of the specified time period, transmitting to the base station for which the status is set a further request to divert at least a part of the communication traffic of a communication currently conducted by the user equipment with the first communication network to the second communication network.

17. A method comprising causing by a base station in a first communication network using a first access technology a transmission of an initial request to a user equipment communicating with the first communication network to divert at least a part of the communication traffic of a wireless communication currently conducted by the user equipment with the first communication network to a second communication network using a second, different access technology, receiving and processing by the base station a report from the user equipment indicating that a diversion of the communication traffic by the user equipment to the second communication network is not conducted, the report comprising a timer value to be set by the first communication network for postponing or stopping a transmission of one or more additional requests, subsequent to the initial request, from the first communication network to the user equipment to divert at least a part of the communication traffic of the communication, setting and storing by the base station a status of the user equipment from which the report is received to a status indicating that it is not acceptable to divert at least a part of the communication traffic of the communication currently conducted by the user equipment with the first communication network to the second communication network, and postponing or stopping, for at least a specified time period determined using the timer value, by the base station a transmission by the first communication network to the user equipment for which the status is set of a further request to divert at least a part of the communication traffic of a communication currently conducted by the user equipment with the first communication network to the second communication network.

18. A computer program product comprising a non-transitory computer-readable storage medium bearing computer program code embodied therein for use with a computer, the computer program code comprising code for performing the method of claim 17.

19. A computer program product comprising a non-transitory computer-readable storage medium bearing computer program code embodied therein for use with a computer, the computer program code comprising code for performing the method of claim 8.

* * * * *

UNITED STATES PATENT AND TRADEMARK OFFICE
CERTIFICATE OF CORRECTION

PATENT NO.        : 10,111,135 B2
APPLICATION NO.   : 14/911096
DATED             : October 23, 2018
INVENTOR(S)       : Hanns Juergen Schwarzbauer et al.

It is certified that error appears in the above-identified patent and that said Letters Patent is hereby corrected as shown below:

In the Claims

Claim 16:
Column 27, Line 27, "base station" should be deleted and --user equipment-- should be inserted.

Signed and Sealed this
Eighth Day of January, 2019

Andrei Iancu
*Director of the United States Patent and Trademark Office*